Aug. 13, 1940.                R. E. SPOKES                2,211,354
         COMPOSITION MATERIAL FOR FRICTION ELEMENTS OR THE LIKE
                         Filed Feb. 18, 1937
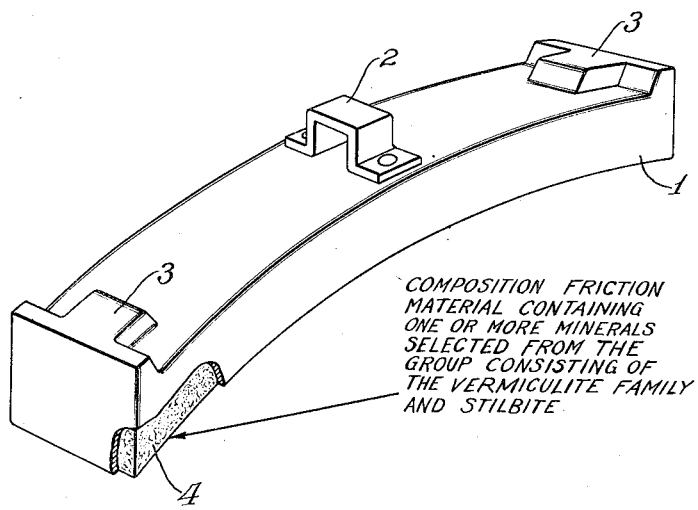
COMPOSITION FRICTION MATERIAL CONTAINING ONE OR MORE MINERALS SELECTED FROM THE GROUP CONSISTING OF THE VERMICULITE FAMILY AND STILBITE
*Inventor:*
*Ray E. Spokes*
By Belt and Wallace
*Attorneys*

Patented Aug. 13, 1940

2,211,354

UNITED STATES PATENT OFFICE 2,211,354

COMPOSITION MATERIAL FOR FRICTION ELEMENTS OR THE LIKE

Ray E. Spokes, Ann Arbor, Mich., assignor to The American Brake Shoe and Foundry Company, Wilmington, Del., a corporation of Delaware Application February 18, 1937, Serial No. 126,406

3 Claims. (Cl. 188—254)

This invention relates to composition materials for friction elements or the like and the salient object is to insure against separation of such material from the means or members in which it is mounted in use.

In the patent to Gallagher and Jones 1,082,266 there is shown a friction element in the form of a brake shoe suitable for use in railway equipment. As there shown the element includes an external metallic shell or casing which contains a filler of composition material and the present invention relates to a composition material adapted for use as the filler in a shell such as that disclosed in the aforesaid patent. This invention, however, is not only adapted for use with a shell such as that disclosed in the aforesaid Gallagher and Jones patent but is applicable in a wide variety of uses. Thus, for example, in my Patent No. 2,114,037 granted April 12, 1938, a plug or a closure is shown which is suitable for use with a friction element to close the openings therein through which fastening means employed to secure such an element in position are extended, and a plug or closure according to the invention of that application may be advantageously made of the composition material to which this invention pertains.

The composition material of this invention is for use in those instances where it will be confined. Thus, for example, the material may be confined in a shell like that shown in the above referred to Gallagher and Jones patent or in the fastening means openings of a friction element in accordance with the invention of my patent or otherwise, and another important object of my invention is to provide a novel composition material which will remain in position when confined in use and an ancillary object is to provide a material which will expand when subjected to heat as, for example, the heat generated in the use of a friction element whereby such expansion may be relied upon to insure retention of the confined material in the position in which it is mounted in use.

A further object is to incorporate in a composition material suitable for friction elements or the like one or more substances which will expand when subjected to heat, and a still further object is to employ one or more substances which, while expandible when subjected to heat, will not upon expansion detrimentally disrupt the internal structure of the composition material in a friction element or the like made from the material.

In the accompanying drawing, a perspective view of a railway brake shoe, I have illustrated a typical use to which the novel composition of this invention may be put.

Among the heat-expandible substances which may be used in composition material for friction elements or the like in accordance with this invention are those included in the vermiculite group. This group comprises a number of micaceous minerals, all hydrated silicates, varying somewhat in composition. They are alteration products chiefly of the micas. Many are more or less of an indefinite chemical nature and the composition varies with that of the original mineral and the degree of alteration. Heated to 100° F. to 110° F. or dried over sulphuric acid, most substances of the vermiculite group lose considerable water, for example, as much as ten percent. Further water is given off when substances of the vermiculite group are subjected to higher temperatures. All such substances have the physical characteristic of exfoliation; some of the substances particularly showing this characteristic to a marked degree, slowly opening out, when heated gradually, into long worm-like threads. The substances included in this group are not entirely distinct species and may best be identified by their names, among which may be cited jeffersite, culsageeite, kerrite, lennilite, hallite, philadelphite, vaalite, maconite, dudleyite, pyraschlerite and also the substance which is known as vermiculite.

Another substance which is suitable for this invention is stilbite (Desmine), a typical formula for which is $(H_4(Na_2Ca)Al_2Si_6O_{18}+4H_2O)$. This substance occurs mostly in cavities in amygdaloidal basalt and similar rocks, and also in some metalliferous veins and in granite.

A substance selected from the vermiculite group or stilbite may be used in a wide variety of composition materials for friction elements or the like but by way of illustration of my invention a formula for a composition friction material suitable for use in a shell such as that shown in the Gallagher and Jones Patent 1,082,266 or from which plugs or closures, such as are disclosed in my Patent No. 2,114,037, may be made and which is suitable for other usages is as follows:

| | Parts by weight |
|---|---|
| Smoke sheet rubber | 10 |
| Sulphur | 3 |
| Carbon black | 10 |
| Barytes | 15 |
| Phenol formaldehyde resin | 6 |
| Short fiber asbestos | 20 |
| Litharge | 2 |

Any of the substances included in the vermiculite group or stilbite may be included in the above formula and this is done by using substantially ninety parts by weight of the composition of the above formula along with substantially ten parts by weight of the substance known as vermiculite or other substance selected from the vermiculite group or stilbite. Furthermore, combinations of two or more such substances may be used in a ratio relative to a composition material somewhat like that just specified. It is also to be noted that vermiculite or other substance selected from the vermiculite group or stilbite or combinations of such substances may be used in other composition materials suitable for use in friction elements or the like and in such circumstances the substances are preferably used in a ratio of substantially ten parts by weight of the substance relative to ninety parts by weight of the composition material.

The above ratio is maintained in those instances where the product is not to be subjected to temperatures of more than 600° F. for in such instances it may be desirable to reduce the ratio to five parts by weight of vermiculite or the like to ninety-five parts by weight of the composition material for so to do reduces the likelihood of disruption of the internal structure of the product upon exfoliation of the heat-expandible substance when the product is subjected to heat in use.

When heat-expandible substances are mixed in a composition material in a ratio substantially like that above specified, the mixture or a product made therefrom when subjected to heat, as for example, the heat generated in the use of a friction element made of the mixture, will be tightly secured in the carrier therefor or a plug or closure made of this mixture and used in the manner described in my aforesaid co-pending application will tightly bind in the opening in which it is mounted. The tight securance of the mixture of a product made therefrom in the carrier or the aforesaid binding in the opening will result by reason of the exfoliation of the substance, such as vermiculite, included in the material, for such exfoliation will result in an expansion of the mixture or material and it is obvious that when the material expands, but is confined, a firm anchorage of the material will result.

When plugs such as those described in my aforesaid Patent No. 2,114,037 are made of the composition material like that of the foregoing formula and a heat-expandible substance is included, the plugs are preferably subjected to a short cure of, for example, thirty minutes at a temperature of 290° F., and when a filler for a shell such as that shown in the aforesaid Gallagher and Jones patent is made of the composition material like that of the above formula it is also preferably cured, the time of cure and temperature employed depending upon the size of the filler and being proportionate to the time involved to cure plugs for use in accordance with my aforesaid co-pending application. A short cure is preferably utilized to avoid undue exfoliation of the substance such as vermiculite so that exfoliation of this substance will not be completed until the composition material is confined and subjected to heat.

When a substance such as vermiculite is used in a ratio relative to the other ingredients of a composition material in a ratio substantially like that above specified, which is to say, in a ratio of from five percent to ten percent, the exfoliation of the substance does not disrupt the internal structure of the article formed from the composition, and in each instance where a substance such as vermiculite is employed along with other ingredients in a composition material in which expansion in use is desirable, care should be taken to keep the quantity of the substance, such as vermiculite, below that which might result in disruption of the internal structure of the article made from the composition.

By way of further describing my invention, I have shown in the accompanying drawing a railway brake shoe of the character disclosed in the aforesaid Gallagher and Jones Patent No. 1,082,266 and which preferably comprises a metallic shell 1 of a longitudinal and transverse configuration conventional in railway brake shoes. The shell 1 has a center attaching lug 2 on the back midway between the ends thereof and the usual end stops 3 on its back at the ends thereof, these parts being constructed and arranged for cooperation with cooperating parts on a conventional brake head to which the shell 1 may be attached by the usual removable key or the like.

The shell 1 is filled with composition friction material, indicated by 4, that is exposed at the open face of the shell and which is of the character hereinabove described whereby, by reason of the property of exfoliation possessed by one or more of the substances included in the composition material, the material 4 is tightly retained in the shell 1 as hereinabove explained.

The preferred form of my invention has been described but it is to be understood that this is capable of variation and modification and I am, therefore, not to be limited to the precise details set forth but desire to avail myself of such changes and alterations as fall within the purview of the following claims.

I claim:

1. A friction element including a body provided with an opening for the reception of a fastening element, said opening containing a plug of friction material and said friction material containing not substantially less than five percent (5%) nor substantially more than ten percent (10%), by weight of said friction material, of one or more minerals selected from the group consisting of the vermiculite family of minerals and stilbite.

2. A friction element including a casing containing a filler of friction material and said friction material containing not substantially less than five percent (5%) nor substantially more than ten percent (10%), by weight of said friction material, of one or more substances selected from the group consisting of the vermiculite family of minerals and stilbite.

3. A friction element embodying friction material and said friction material containing not substantially less than five percent (5%) nor substantially more than ten percent (10%), by weight of said friction material, of one or more substances selected from the group consisting of the vermiculite family of minerals and stilbite.

RAY E. SPOKES.